(12) United States Patent
Bott et al.

(10) Patent No.: US 9,884,728 B2
(45) Date of Patent: Feb. 6, 2018

(54) OSCILLATING CONVEYOR AND METHOD FOR OPERATION OF AN OSCILLATING CONVEYOR

(71) Applicant: Afag Holding AG, Hergiswil (CH)

(72) Inventors: Klaus Bott, Altdorf (DE); Izudin Mesan, Nürnberg (DE); Sebastian Mojrzisch, Hannover (DE); Jens Twiefel, Hannover (DE); Jörg Wallascheck, Hannover (DE)

(73) Assignee: AFAG HOLDING AG, Hergiswil (CH)

( * ) Notice: Subject to any disclaimer, the term of this patent is extended or adjusted under 35 U.S.C. 154(b) by 0 days.

(21) Appl. No.: 14/817,309

(22) Filed: Aug. 4, 2015

(65) Prior Publication Data
US 2016/0039613 A1  Feb. 11, 2016

(30) Foreign Application Priority Data

Aug. 6, 2014 (DE) .................. 10 2014 111 166

(51) Int. Cl.
  *B65G 27/32* (2006.01)
  *B65G 27/24* (2006.01)
  *B65G 27/08* (2006.01)
  *G05D 19/02* (2006.01)

(52) U.S. Cl.
  CPC ............. *B65G 27/32* (2013.01); *G05D 19/02* (2013.01)

(58) Field of Classification Search
  None
  See application file for complete search history.

(56) References Cited

U.S. PATENT DOCUMENTS

| 4,194,238 | A | * | 3/1980 | Masaki | ................. | H02J 7/0072 363/132 |
| 5,472,079 | A | | 12/1995 | Yagi et al. | | |
| 5,777,232 | A | * | 7/1998 | Kurita | ................... | G05D 19/02 198/750.1 |

(Continued)

FOREIGN PATENT DOCUMENTS

| DE | 29623652 U1 | 1/1996 |
| DE | 19531674 A1 | 3/1997 |
| DE | 69407219 T2 | 7/1998 |

OTHER PUBLICATIONS

European Search Report for parallel European Application No. EP 15 17 5691 dated Jan. 20, 2016, 6 pages.

(Continued)

*Primary Examiner* — Kavel Singh
(74) *Attorney, Agent, or Firm* — Lucas & Mercanti, LLP; Klaus P. Stoffel

(57) ABSTRACT

An oscillating conveyor comprising an oscillating rail, at least one electromagnet with a coil, and an armature connected to the oscillating rail, which armature can be moved by activation of the coil to generate an oscillation of the oscillating rail, wherein the coil is part of an oscillator circuit, wherein the oscillator frequency of the oscillator signal of the oscillator circuit depends on the inductance of the coil, which is influenced by the position of the armature relative to the coil, wherein the oscillating conveyor comprises a feedback circuit, which drives the coil by means of a control signal which maps the change over time in the frequency of the oscillator.

15 Claims, 2 Drawing Sheets

(56) References Cited

U.S. PATENT DOCUMENTS

| | | | | |
|---|---|---|---|---|
| 5,931,285 A * | 8/1999 | Madsen | ............... | G05D 19/02 198/761 |
| 6,079,549 A * | 6/2000 | Meitinger | ............. | B65G 27/32 198/751 |
| 6,192,754 B1 * | 2/2001 | Czarnek | .............. | G01D 5/2046 73/290 R |

OTHER PUBLICATIONS

An Office Action dated Jul. 7, 2016 from corresponding Canadian Application No. 2,897,703 (7 pages).
German Office Action 10 2014 111 166.4 dated Jan. 25, 2017 (4 pages).
An Office Action dated May 29, 2017 from corresponding Canadian Application No. 2,897,703 (4 pages).

* cited by examiner

OSCILLATING CONVEYOR AND METHOD FOR OPERATION OF AN OSCILLATING CONVEYOR

CROSS-REFERENCE TO RELATED APPLICATIONS

The present application claims priority of 10 2014 111 166.4, filed Aug. 6, 2014, the priority of this application is hereby claimed and this application is incorporated herein by reference.

BACKGROUND OF THE INVENTION

The invention pertains to an oscillating conveyor comprising an oscillating rail, at least one electromagnet with a coil, and an armature connected to the oscillating rail, which armature can be moved to activate the coil, thus generating an oscillation of the oscillating rail, wherein the coil is part of an oscillator circuit, wherein the oscillation frequency of the oscillator signal of the oscillator circuit depends on the inductance of the coil, which is influenced by the position of the armature relative to the coil.

Oscillating conveyors are used in automated production processes to transport material along rails, e.g., to feed small parts such as structural components. By means of an elliptical shaking movement, the material to be conveyed is guided along a predefined path. The elliptical shaking movement is produced by means of at least one electromagnet. The electromagnet periodically attracts an armature connected to the oscillating rail of the oscillating conveyor, wherein a previously determined restoring force produced by elastic means, typically leaf springs, acts on the oscillating rail and thus on the armature.

The magnitude of the oscillatory amplitude is related to the output of the conveyor, for which reason it is desirable to achieve the largest possible oscillatory amplitude. To achieve this with low energy input, the oscillating conveyor should be operated near its resonance frequency. The problem with this is that, because of the way such a conveyor is built, its oscillations are typically nonlinear, which means that even small deviations from the resonance frequency can lead to pronounced changes in the oscillatory amplitude or even to the collapse of the oscillation.

To excite an oscillating conveyor at a frequency near its resonance frequency, DE 195 31 674 proposes that the inductance of the oscillating conveyor's drive coil, which varies with the timing of the vibrations, be evaluated so that the drive coil can be supplied with drive pulses at the natural frequency of the conveyor. To this end, a digital counter, which is increased at a fixed rate, is read out at intervals determined by a resonator circuit, which comprises the drive coil as a frequency-determining element. The counter status which is read out therefore varies with the timing of the mechanical vibrations of the conveyor, so that, by means of a central unit, a favorable point in the time can be calculated for a drive pulse.

SUMMARY OF THE INVENTION

The invention is based on the goal of providing an oscillating conveyor which, with circuitry of only modest complexity, can be operated reliably near and/or at the conveyor's resonance frequency.

The goal is achieved according to the invention by an oscillating conveyor of the type described above, wherein the oscillating conveyor comprises a feedback circuit, which activates the coil by means of a control signal which maps the change over time in the oscillator frequency.

According to the invention, it is proposed that the oscillating conveyor be self-excited rather than being excited by outside means supplying the oscillating conveyor with a predefined oscillation or supplying the coil with predefined current pulses. The coil of the oscillating conveyor is activated by a signal derived from the oscillations of the oscillating conveyor itself. The fact is exploited here that the inductance of the coil depends on the position of the armature relative to the coil. A coil of an oscillating conveyor can in particular be mounted on a yoke, which bundles the magnetic field lines of the coil. The inductance of the coil changes as a function of the size of the air gap between the yoke and the armature.

If an oscillator circuit is provided which, in particular, comprises the coil as an element of a resonator circuit of the oscillator circuit, then the frequency of the oscillator signal of the oscillator depends on the distance between the armature and the coil. If the distance between the armature and the coil is short, the coil has a strong inductance, and when use is made of this in a resonator circuit, it leads to a lower resonance frequency of the resonator circuit and thus to a lower oscillator frequency. As the distance between the armature and the coil increases, the oscillator circuit is detuned to higher frequencies. The relationship between the oscillator frequency and a distance between the armature and the coil is thus strictly monotonic, which means that a change in the oscillator frequency can be interpreted approximately as a location signal of the armature. The change in the oscillator frequency thus corresponds to a "distorted" version of the change in the distance between the anchor and the coil. By feeding back this signal and selecting an appropriate phase position, the oscillating conveyor can be operated near the resonance frequency. Because the oscillation in this case excites itself, the amplitude of the oscillation is stable.

The feedback circuit can comprise a demodulation circuit for frequency demodulation, which is configured to generate the control signal from the oscillator signal or to generate a measurement signal, as a function of which the control signal is provided, from the oscillator signal. Because of the oscillation of the oscillating conveyor and thus because of the movement of the armature relative to the coil, the oscillator signal comprises an oscillator frequency which changes over time. The oscillator signal can thus be interpreted as a signal with a carrier frequency, namely, a signal which is frequency-modulated by a modulation signal. By means of a demodulation circuit, it is possible to recover the modulation signal, i.e., the change over time in the oscillator frequency.

Alternatively, if the distance between the oscillation frequency of the oscillating conveyor and the frequency of the oscillator is sufficient, it would also be possible to measure the durations of the periods of the oscillator signal and from these to determine the change over time in the oscillator frequency. To measure a period duration, it is possible, for example, to use digital counters or analog integrators, which are set back when a certain slope and/or a certain value of the oscillator signal occurs.

The demodulation circuit can in particular comprise a phase-locked control circuit. The phase-locked control circuit can comprise a voltage-controlled oscillator and a phase detector, wherein the phase detector determines the relative phase position between the voltage-controlled internal oscillator and the incoming oscillator signal. A phase detector can be configured in such a way that the incoming oscillator signal and the signal of the internal oscillator are converted, by means of saturation, for example, into signals with exactly two possible values, and the two signals are linked by an XOR gate. Numerous additional phase detectors are known in the prior art.

The output signal of the phase detector can be sent to a loop filter with a preset limit frequency. The output signal of the loop filter can be returned as control voltage to the voltage-controlled oscillator. If a voltage-controlled oscillator with linear frequency control is used, then the output signal of the loop filter, i.e., the control voltage of the oscillator, is essentially the same, aside from a constant offset, as the change over time in the frequency of the input signal. By means of a phase-locked control circuit, to which the oscillator signal is supplied as an input signal, a signal is provided as output signal which therefore maps the change over time in the frequency of the oscillator. Any offset of the output signal which may be present can be removed by a DC filter, for example, and/or the feedback circuit can be balanced in such a way that the offset is zero.

As an alternative to the use of a phase-locked control circuit in the demodulation circuit, other switching circuits can also be used for frequency demodulation such as discriminator circuits, especially slope, difference, or phase discriminators.

The feedback circuit can comprise a phase-shifter circuit, which is configured to change the phase position of the measurement signal for the purpose of providing the control signal. As already explained, the change over time in the oscillator frequency is an approximate analog of the change in the location of the armature. For linear oscillations, i.e., oscillations where the restoring force corresponds to the second derivative with respect to time of the location, it is known that, when resonance is present, the change over time in the excitation force is shifted 90° versus a locus of the oscillation. A phase shift of 90° can be achieved by means of, for example, a capacitor, or especially by means of a downline operational amplifier, i.e., an op-amp with a differentiator circuit. The phase position of the control signal can be adapted by, for example, providing ohmic resistance in parallel to the capacitor. In particular, variable ohmic resistance can be provided to make possible a subsequent adjustment of the phase position. Alternatively, however, it would also be possible to use other phase-shifter circuits such as an all-pass filter.

It is advantageous for the feedback circuit to comprise an amplifier circuit, which is configured to amplify the measurement signal for the purpose of providing the control signal. The coil of the electromagnet of the oscillating conveyor can be operated at relatively high voltages of, for example, 110 or 220 volts, and high currents can flow through it. Signal processing, especially a demodulation of the oscillator signal, by means of power electronics is relatively complicated and expensive. Therefore, it is advantageous for the previously described processing of the oscillator signal to be carried out at relatively low voltages and currents, such as in a voltage range of ±10 volts. As the last processing step, the control signal can be amplified before it is sent to the coil. Amplification can be carried out by, for example, mosfets, IGBTs, or the like.

It is possible in particular for the measurement signal to be phase-shifted first and then amplified in order to provide the control signal. Before or after the phase shift of the measurement signal, the signal can also be filtered to remove in particular higher harmonic oscillatory components, for example, from the measurement signal, i.e., components which are present in the measurement signal especially as a result of the nonlinear relationship between the location of the armature and the change in the frequency of the oscillator.

It is advantageous for the oscillating conveyor to comprise a starter circuit, which is configured to drive the coil for a previously determined time interval by means of a previously determined activation signal. In particular, the starter circuit can be configured to send a voltage or current pulse to the coil. It is possible for the starter circuit to be configured completely separately from the feedback circuit, but it is advantageous for the activation signal of the starter circuit to be sent via the previously described amplifier circuit. The control signal serves in particular to deflect the oscillating conveyor a single time, so that the oscillating conveyor can then oscillate freely at its own resonance frequency. This free oscillation leads simultaneously to a change in the oscillator frequency, as a result of which, as described above, a control signal is provided for operating the oscillating conveyor by self-excitation. Alternatively, it would also be possible to start the oscillating conveyor by means of mechanical excitation.

The oscillator circuit can in particular comprise capacitors connected in series with each other and in parallel to the coil, wherein a tap for the oscillator signal is provided between the capacitors. As previously explained, it is advantageous for at least some of the signal processing of the oscillator signal to be carried out at voltages lower than those present at the coil. This is possible, advantageously, in that the capacitors connected in series are used as voltage dividers in the oscillating conveyor.

It is possible for the oscillator signal itself to be fed back to the resonator circuit comprising the coil in order to maintain the self-oscillation of the oscillator. So that this, too, can be carried out at relatively low voltages, it is possible for the oscillator circuit to comprise two additional capacitors connected in series to each other and in parallel to the coil, wherein a feedback point for the oscillator signal is provided between the additional capacitors.

In the oscillating conveyor according to the invention, the oscillator frequency can be at least five times, especially at least ten times, higher than a resonance frequency of the oscillation of the oscillating rail. This achieves the goal that the frequency at which the oscillator frequency changes is much lower than the oscillator frequency itself, as a result of which demodulation can be carried out more easily. In particular, when a demodulation circuit with a phase-locked control circuit is used, it is possible to use a loop filter with a limit frequency which is considerably below the oscillator frequency, e.g., below by a factor of 5, as a result of which a smoother output signal can be provided.

It is possible for the oscillating rail in the oscillating conveyor according to the invention to be supported by at least one leaf spring with several leaves, wherein the spring leaves are each separated from each other by a spacer and/or wherein a friction-reducing element is arranged between the spring leaves. In oscillating conveyors, the friction between the spring layers of the leaf springs supporting the oscillating rail is typically used to damp the oscillation of the oscillating rail and thus to reduce the quality factor of the oscillation. This is necessary, because the oscillation of an oscillating conveyor is typically nonlinear, and a stable oscillation near the resonance frequency is almost impossible to achieve in cases of externally excited nonlinear oscillation. Even a change in the temperature of the oscillating conveyor or the like would, in the case of externally excited oscillations not subjected to any further damping, lead to oscillations with considerable differences between their amplitudes. The oscillating conveyor according to the invention, however, is self-excited, for which reason, even without additional damping of the oscillating conveyor, that is, in the case of a high quality factor of the oscillation of the oscillating rail, more stable operation at or near the resonance frequency is possible.

In addition to the oscillating conveyor, the invention also pertains to a method for operating an oscillating conveyor comprising an oscillating rail, at least one electromagnet with a coil, and an armature connected to the oscillating rail, wherein the armature is moved by activation of the coil, as a result of which an oscillation of the oscillating rail is generated;

wherein the coil is part of an oscillator circuit;

wherein the oscillator frequency of the oscillator signal of the oscillator circuit depends on the inductance of the coil, which is influenced by the position of the armature relative to the coil;

wherein the oscillating conveyor comprises a feedback circuit; and wherein the coil is activated by the feedback circuit by means of a control signal which maps the change over time in the frequency of an oscillator frequency.

The feedback circuit can comprise a demodulation circuit for frequency demodulation, by means of which the control signal is generated from the oscillator signal, or by means of which a measurement signal is generated from the oscillator signal, as a function of which the control signal is provided.

It is possible for the feedback circuit to comprise a phase-shifter circuit, by means of which the phase position of the measurement signal is changed for the purpose of providing the control signal. Alternatively or in addition, the feedback circuit can comprise an amplifier circuit, by means of which the measurement signal is amplified to provide the control signal.

The oscillating conveyor can comprise a starter circuit, by means of which the coil is activated for a previously determined time interval by a previously determined activation signal.

In addition, the method according to the invention can be elaborated in accordance with the features explained above in conjunction with the oscillating conveyor according to the invention.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
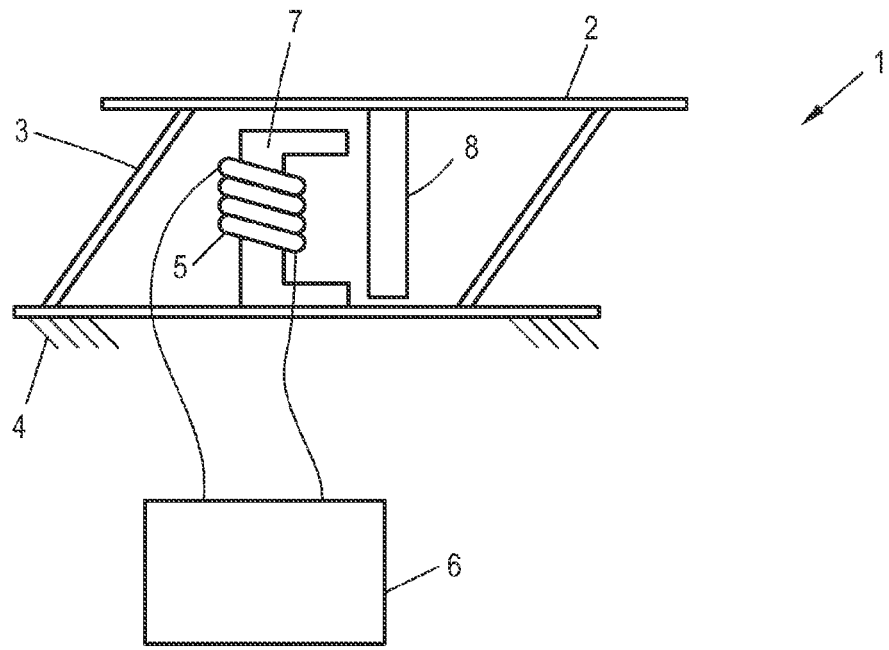
FIG. 1 shows an exemplary embodiment of an oscillating conveyor according to the invention.

FIG. 1 shows an oscillating conveyor 1, which comprises an oscillating rail 2, on which goods can be transported by the vibrations of the oscillating rail 2. The oscillating rail 2 is supported on a bottom plate 4 by leaf springs 3. To excite oscillations of the oscillating rail 2, the oscillating conveyor 1 comprises the coil 5, which can be supplied with current by an electronic control system 6. When current flows through the coil 5, a magnetic field is generated, which is bundled by the yoke 7, as a result of which the armature 8 connected to the oscillating rail 2 is pulled toward the yoke 7, i.e., toward the coil 5.

When the electronic control system 6 sends a periodic signal current to the coil 5, the attractive force of the coil 5 acting on the armature 8 varies periodically, as a result of which the armature 8 and thus the oscillating rail 2 are caused to oscillate. To achieve large oscillation amplitudes of the oscillating rail 2 and thus a high conveying rate with only a small amount of energy input, the power being sent to the coil 5 must have a periodicity which corresponds to a mechanical resonance frequency of the oscillating conveyor 1.

A stable excitation at or near the mechanical resonance frequency of the oscillating conveyor 1 is achieved in the oscillating conveyor 1 by providing for the self-excitation of the oscillating conveyor 1, in which the electronic control system 6 sends the coil 5 a signal generated as a function of the oscillation of the oscillating rail 2 of the oscillating conveyor 1. For this purpose, use is made of the fact that, when the oscillating rail 2 oscillates, the armature oscillates as well and thus the distance between the yoke 7 and the armature 8 changes. Because of the changing air gap between the yoke 7 and the armature 8, the inductance of the coil 5 also changes when the oscillating rail 2 oscillates. The electronic control system 6 is configured to evaluate the change in the inductance of the coil 5 and to send current to the coil as a function of these changes in inductance. This is explained in greater detail below with reference to FIG. 2.

Figure 2:
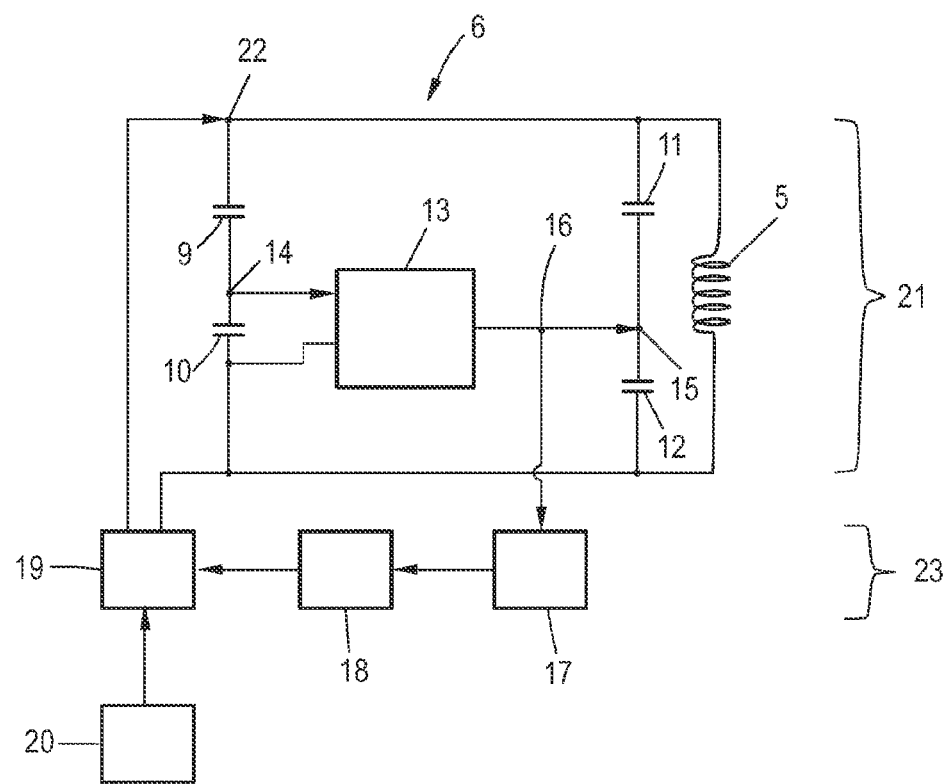
FIG. 2 shows the electronic control circuit of the oscillating conveyor shown in FIG. 1.

FIG. 2 shows schematically the layout of the electronic control system 6 and the connection of the electronic control system 6 to the coil 5. The coil 5 and the capacitors 9, 10, 11, 12 form a resonator circuit. The resonance frequency of the resonator circuit depends on the inductance of the coil 5, which varies as a function of the oscillation of the oscillating rail 2. The resonator circuit and a driver circuit 13 together from an oscillator circuit 21, wherein the resonance frequency of the resonator circuit determines the oscillator frequency of the oscillator signal of the oscillator circuit 21.

The oscillator signal of the oscillator circuit 21 is tapped at a tap 14 between the capacitors 9 and 10. The capacitors 9 and 10 act as voltage dividers, as a result of which lower maximum voltages are reached at the tap 14 than those present at the coil 5 during operation of the oscillating conveyor 1. The coil 5 is supplied with relatively high voltages, possibly as high as 220 volts. The capacitors 9, 10 are selected in such a way that the maximum voltage at the tap 14 does not exceed a previously determined value such as 12 volts. Thus the feedback of the oscillator signal and the evaluation of the oscillator frequency, to be explained in greater detail below, can be carried out by circuits which are designed for low-voltage operation.

To maintain an oscillation in the resonator circuit, the driver circuit 13 amplifies the signal tapped at the tap 14, adjusts the phase of the signal, and feeds it back into the resonator circuit at the point 15 between the capacitors 11 and 12. Like the capacitors 9, 10, the capacitors 11 and 12 also serve as voltage dividers. As a result of the feedback from the tap 14 via the driver circuit 13 to the coupling-in point 15, a stable self-oscillation of the oscillator circuit 21 is achieved at an oscillator frequency determined by the resonator circuit, in particular by the coil 5.

The resonance frequency of a resonator circuit and thus the oscillator frequency of the oscillator signal of the oscillator circuit 21 are inversely proportional to the root of the inductance of the coil of the resonator circuit. When the armature 8 approaches the yoke 7, the inductance of the coil 5 increases, whereas the oscillator frequency decreases correspondingly and vice versa. When the oscillating rail oscillates, the oscillator frequency thus varies with a frequency which corresponds to the frequency of the oscillation of the oscillating rail. The change in the oscillator frequency also comprises a defined phase position with respect to the oscillation of the oscillating rail 2. The change over time in the oscillator frequency is thus a suitable measurement signal, which can be used as a control signal for the coil 5 or from which a control signal for the coil 5 can be derived to operate the oscillating conveyor at or near the resonance frequency of the oscillating conveyor.

For this purpose, the oscillator signal of the oscillator circuit 21 is tapped at the connection point 16 and sent to a demodulation circuit 17. The demodulation circuit 17 serves to frequency-demodulate the oscillator signal to provide the change over time in the oscillator frequency. The demodulation of the oscillator signal is done by the use of a phase-locked control circuit. The oscillator signal is sent to an input of a phase detector, the other input of which is connected to the output of an internal, voltage-controlled oscillator of the phase-locked control circuit. The output signal of the phase detector corresponds to the phase difference between the signal of the internal oscillator and that of the oscillator circuit. Numerous phase detector circuits are known, for which reason, purely by way of example, a saturation of the two signals and the transmission of the saturated signals to a digital XOR gate can be mentioned. The output signal of the phase detector is sent to a loop filter, and the signal, thus filtered, is used for the voltage control of the internal oscillator. When the phase-locked control circuit "locks", the output voltage of the loop filter, aside from a possible offset, corresponds to the frequency of the incoming signal and thus to the oscillator frequency of the oscillator circuit 21. By appropriately balancing the demodulation circuit 17 or by using a high-pass filter, a signal which maps the change over time in the frequency of the oscillator circuit 21 is provided.

This signal is sent as the measurement signal to a phase-shifter circuit 18, which can change the phase of the measurement signal. The phase can be shifted by sending the measurement signal to a parallel circuit between a resistor and a capacitor, for example. The phase of the resulting current is determined as a function of the relative sizes of the resistor and the capacitor. The current can then be converted back into a voltage by means of, for example, an op-amp. The inductance of the coil 5 and thus the oscillator frequency of the oscillator circuit 21 fluctuates, as explained, as a function of the distance between the armature 8 and the yoke 7, i.e., the coil 5. Thus, the oscillator frequency maps, with a certain distortion, the location of the armature 8 and thus of the oscillating rail 2. If the oscillation of the oscillating conveyor 1 were a harmonic oscillation, the excitation signal to be selected would be phase-shifted by 90° versus a locus of the oscillation of the oscillating rail 2. Even if the oscillation of the oscillating conveyor 1 is not harmonic, as is to be expected for the oscillating conveyor 1, it is still advantageous for the phase-shifter circuit 18 the shift the phase by about 90°.

Before or after the phase shift, the measurement signal can be filtered supplementally by a filter circuit (not shown) in order to damp higher harmonic oscillations of the measurement signal. The measurement signal can comprise strong harmonic components, the feedback of which is undesirable; such components are a result in particular of the nonlinear relationships between the distance of the armature 8 to the yoke 7 and the inductance of the coil 5 and between the oscillator frequency of the oscillator signal of the oscillator circuit 21 and the inductance of the coil 5.

The measurement signal is then sent to the amplifier circuit 19, which amplifies the measurement signal and thus provides a control signal. By means of the amplifier circuit 19, a change to a higher voltage range occurs, at which the coil 5 is operated; this can be, for example, a voltage range extending up to as much as 220 volts. The amplified control signal is coupled into the resonator circuit at point 22 and thus arrives at the coil 5.

The demodulation circuit 17, the phase-shifter circuit 18, and the amplifier circuit 19 thus form together a feedback circuit 23, which activates the coil by means of a control signal which maps the change over time in the oscillator frequency. As a result of this activation, the oscillating conveyor 1 excites itself, so that, once an oscillation of the oscillating conveyor 1 has been excited at or near the resonance frequency, the oscillation remains there in stable fashion. The amplitude of the oscillation can be determined by the amplification factor of the amplifier circuit. Alternatively or in addition, the amplitude and also the oscillation frequency relative to the resonance frequency of the oscillating conveyor 1 can be adjusted by setting the degree to which the phase is changed in the phase-shifter circuit 18.

If the excitation of the oscillating conveyor 1 is exclusively a self-excitation, the oscillating conveyor 1 must be started by mechanical excitation of the oscillations. So that the oscillating conveyor 1 can be started simply and reliably, the control electronics 6 comprise a starter circuit 20, which activates the coil for a previously determined interval with a previously determined activation signal. The starter circuit 20 also makes use of the amplifier circuit 19 for this purpose. The activation signal is a current pulse of defined length. By means of this current pulse, the armature 8 and thus the oscillating rail 2 are deflected a single time and then, at the end of the current pulse, begin to oscillate at the resonance frequency of the oscillating conveyor 1. The oscillator frequency of the oscillator circuit 21 changes correspondingly as a result of this oscillation, and, by means of the demodulation circuit 17, a measurement signal is obtained which, as previously explained, can be subjected to further processing and also fed back to maintain the oscillations.

Figure 3:
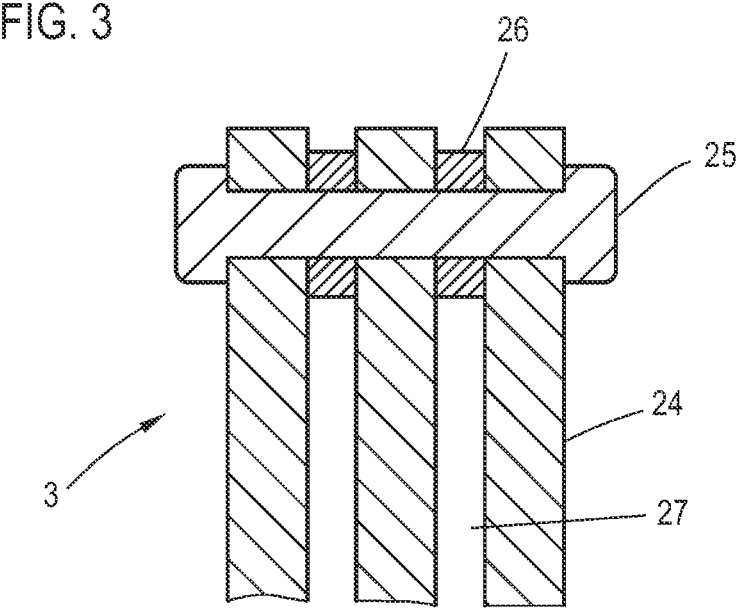
FIG. 3 shows a view of a detail of a leaf spring of the oscillating conveyor shown in FIG. 1.

An essential advantage of self-excited oscillations is that stable operation of the oscillating conveyor at or near the resonance frequency is possible, even if the oscillating conveyor 1 is not subjected to any additional damping. In typical oscillating conveyors, leaf springs are used for additional damping of the oscillating conveyor; the layers of the springs rub against each other and thus take energy away from the oscillation. Such additional damping is not necessary in the oscillating conveyor 1 according to the invention. The efficiency of the oscillating conveyor 1 according to the invention can thus be further increased, in that such additional damping is avoided. Therefore, in the oscillating conveyor according to FIG. 1, leaf springs 3 are used, which are configured as shown in FIG. 3. The leaf springs 3 comprise several spring layers 24, which are connected along one edge by a connecting element 25. Between the spring layers are spacers 26, as a result of which hollow spaces 27 are formed between the spring layers 24. Because the spring layers 24 are separated from each other by the hollow spaces 27, they do not rub at all; or, when they are strongly bent, they rub to a far lesser extent than in the case of conventional leaf springs, in which the spring layers rest directly on each other. The oscillation of the oscillating conveyor 1 is thus damped to a far lesser degree than is the case with conventional oscillating conveyors.

Figure 4:
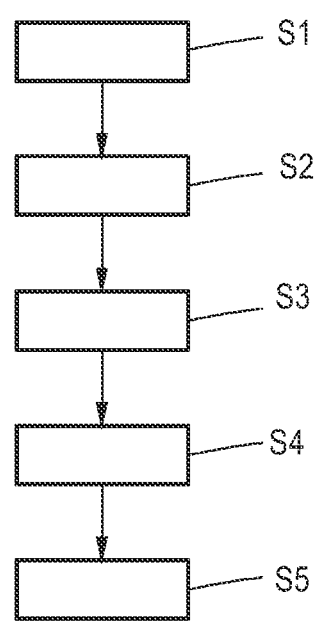
FIG. 4 shows a flow chart illustrating the method according to the invention.

FIG. 4 shows a method for operating an oscillating conveyor 1, wherein the oscillating conveyor 1 is operated by self-excitation. The structure of the oscillating conveyor 1 corresponds to that of the oscillating conveyor 1 explained on the basis of FIGS. 1-3. In step S1, the oscillation of the oscillator circuit 21, which comprises the coil 5, is tapped at a tap 14. The oscillator oscillation is fed back to the resonator circuit formed by the coil 5 and the capacitors 9, 10, 11, 12, and also sent to a demodulation circuit 17.

In step S2, the oscillator oscillation is demodulated by the demodulation circuit 17, as a result of which a signal is provided, the change in which corresponds to the change in the frequency of the oscillator. In step S3, the phase of this signal is shifted by the phase-shifter circuit 18.

The phase-shifted signal is amplified in step S4 and to provide a control signal, which is used in step S5 to drive the coil.

While specific embodiments of the invention have been shown and described in detail to illustrate the inventive principles, it will be understood that the invention may be embodied otherwise without departing from such principles.

We claim:

1. An oscillating conveyor comprising:
an oscillating rail;
at least one electromagnet with a coil;
an armature coupled to the oscillating rail, the armature being movable by activation of the coil to generate an oscillation of the oscillating rail;
an oscillator circuit having an oscillator signal, wherein the coil is part of a resonator circuit of the oscillator circuit, a resonance frequency of the resonator circuit depends on the inductance of the coil, which is influenced by the position of the armature relative to the coil, and the resonance frequency of the resonator circuit determines the oscillator frequency of the oscillator signal, wherein the frequency of the oscillator signal depends on a distance between the armature and the coil; and
a feedback circuit, which drives the coil by means of a control signal which maps the change over time in the oscillator frequency, wherein the feedback circuit comprises a demodulation circuit for frequency demodulation or a measurement circuit for measuring durations of periods of the oscillator signal, which is configured to generate the control signal from the oscillator signal or to generate, from the oscillator signal, a measurement signal that describes the change over time in the oscillator frequency, as a function of which the control signal is provided.

2. An oscillating conveyor according to claim 1, wherein the demodulation circuit comprises a phase-locked control circuit.

3. An oscillating conveyor according to claim 1, wherein the feedback circuit comprises a phase-shifter circuit, which is configured to change the phase position of the measurements signal for the purpose of providing the control signal.

4. An oscillating conveyor according to claim 1, wherein the feedback circuit comprises an amplifier circuit, which is configured to amplify the measurement signal for the purpose of providing the control signal.

5. An oscillating conveyor according to claim 1, further comprising a starter circuit, which is configured to activate the coil for a previously determined time interval by means of a previously determined activation signal.

6. An oscillating conveyor according to claim 1, wherein the oscillator circuit comprises two capacitors connected in series to each other and in parallel to the coil, wherein a tap for the oscillator signal is provided between the capacitors.

7. An oscillating conveyor according to claim 1, wherein the oscillator frequency is at least 5 times higher than a resonance frequency of the oscillation of the oscillating rail.

8. An oscillating conveyor according to claim 1, wherein the oscillating rail is supported by at least one leaf spring with several spring layers, and at least one of spacers separating the spring layers from each other and a friction-reducing element arranged between the spring layers.

9. An oscillating conveyor according to claim 1, wherein the oscillator circuit includes a resonator circuit and a driver circuit.

10. An oscillating conveyor according to claim 9, wherein the resonator circuit includes the coil, a first capacitor, and a second capacitor, the first capacitor and the second capacitor are connected in series with each other and in parallel to the coil, a tap for the oscillator signal is connected between the first capacitor and the second capacitor, and the oscillator signal is connected as an input to said driver circuit.

11. An oscillating conveyor according to claim 10, wherein the resonator circuit further comprises a third capacitor and a fourth capacitor connected in series with each other and in parallel to said coil, and output of said driver circuit being connected between said third capacitor and said fourth capacitor, and the output of said driver circuit being connected as an input to said feedback circuit.

12. A method for operating an oscillating conveyor which comprises an oscillating rail, at least one electromagnet with a coil, an armature connected to the oscillating rail, an oscillator circuit having an oscillator signal with an oscillator frequency, wherein the coil is part of a resonator circuit of the oscillator circuit, and a feedback circuit, the method comprising the steps of:
moving the armature by activation of the coil, as a result of which the oscillating rail is caused to oscillate;
determining a resonance frequency of the resonator circuit based on the inductance of the coil, which is influenced by the position of the armature relative to the coil, wherein the resonance frequency of the resonator circuit determines the oscillator frequency of the oscillator signal of the oscillator circuit, wherein the frequency of the oscillator signal depends on a distance between the armature and the coil,
activating the coil by the feedback circuit based on a control signal which maps the change over time in the oscillator frequency, wherein the feedback circuit comprises a demodulation circuit for frequency demodulation or a measurement circuit for measuring durations of periods of the oscillator signal, which is configured to generate the control signal from the oscillator signal or to generate, from the oscillator signal, a measurement signal that describes the change over time in the oscillator frequency, as a function of which the control signal is provided.

13. A method according to claim 12, wherein the feedback circuit comprises a phase-shifter circuit, and the method comprising changing, by the phase-shifter circuit, the phase position of the measurements signal for the purpose of providing the control signal.

14. A method according to claim 12, wherein the feedback circuit comprises an amplifier circuit, and the method comprises amplifying, by the amplifier circuit, the measurement signal for the purpose of providing the control signal.

15. A method according to claim 12, wherein the oscillating conveyor comprises a starter circuit, and the method comprises activating, by the starter circuit, the coil for a previously determined time interval by a previously determined activation signal.

\* \* \* \* \*